United States Patent [19]

Momenthy

[11] Patent Number: 4,809,174
[45] Date of Patent: Feb. 28, 1989

[54] AIRCRAFT ENERGY LOADING METHOD AND APPARATUS

[75] Inventor: Albert M. Momenthy, Kent, Wash.

[73] Assignee: The Boeing Company, Seattle, Wash.

[21] Appl. No.: 857,081

[22] Filed: Apr. 29, 1986

[51] Int. Cl.$^4$ .............................................. G01F 13/00
[52] U.S. Cl. .............................. 364/424.01; 364/442;
364/509; 73/861
[58] Field of Search .............. 364/424, 465, 442, 466,
364/509, 510, 567, 564, 571; 73/861, 195

[56] References Cited

U.S. PATENT DOCUMENTS

| | | | |
|---|---|---|---|
| 2,937,519 | 5/1960 | Brace et al. | |
| 3,772,915 | 11/1973 | Stamler | 73/113 X |
| 4,134,301 | 1/1979 | Erwin, Jr. | 73/453 |
| 4,313,168 | 1/1982 | Stephen et al. | 364/465 |
| 4,505,124 | 3/1985 | Mayer | 250/339 |
| 4,536,843 | 8/1985 | Lambregts | 364/440 |
| 4,553,032 | 11/1985 | Lo et al. | 62/180 |
| 4,553,216 | 11/1985 | Stevens | 364/558 |

OTHER PUBLICATIONS

"Microprocessor Based Totalizing Mass Fuel Flow Measurement System", Proposal No. 949-011 to Chicago O'Hare Airport, 7/79, pp. 1-7, Cox Instruments.
Gallichan, British Airways-Technical Services, "Measurement of Fuel Weight Delivered to Aircraft", 9/84, Paper #1; 8/83, Paper #2.

Primary Examiner—Parshotam S. Lall
Assistant Examiner—Thomas G. Black
Attorney, Agent, or Firm—Finnegan, Henderson, Farabow, Garrett & Dunner

[57] ABSTRACT

A method and apparatus for loading an aircraft fuel tank with sufficient fuel for a selected flight based on the measured energy content of the fuel. The density of the fuel loaded on the aircraft is measured and converted to a value for energy content based upon an observed relationship between energy content and density. In a second preferred embodiment, the energy content per unit volume of the loaded fuel is measured directly with a calorimeter. Both embodiments utilize learning to narrow the error band of the energy content density relationship and to recalibrate the calorimeter.

12 Claims, 5 Drawing Sheets

AIRCRAFT ENERGY LOADING METHOD AND APPARATUS

BACKGROUND OF THE INVENTION

The present invention relates to a method and apparatus for loading an aircraft fuel tank with jet fuel sufficient for a selected flight.

It is the present practice in the airline industry to load an aircraft with a quantity of fuel for a selected flight based on either fuel weight or fuel volume. Present fuel loading procedures utilize an assumed density and an assumed minimum heat content per unit weight of the fuel to ensure that the fuel on board the aircraft contains sufficient total energy to complete the selected mission. Recent studies indicate that worldwide variations in the actual heat content of delivered jet fuel range from a low of 18,430 BTU per pound to a high of 19,000 BTU per pound, as compared to the assumed value of 18,400 BTU per pound guaranteed by fuel suppliers. Actual test data has shown that the heat content of the delivered fuels increases substantially linearly with the density. Thus, although such present airline loading practices satisfy fuel reserve and contingency requirements, they result in the loading of excess fuel since the actual energy content of delivered fuels is normally higher than the guaranteed minimum value. The extra fuel carried on board airlines as a result of utilizing a lower than necessary heat content value to determine the required volume or weight of fuel is carried as dead weight. This weight could have been allocated to increased payload, or, alternatively the flight could have been made at a lower weight with less fuel required for the trip.

In addition to the weight penalties associated with loading an aircraft with fuel based upon an assumed minimum fuel heat content, improper accounting of fuel energy in this manner can lead to an apparent reduction in aircraft range capability. This apparent range reduction can have a negative impact on airline route plans and can cause potential customers for aircraft to question aircraft range claims.

It is therefore an object of the present invention to provide a fuel loading system and method in which an aircraft is loaded with fuel based on measured energy content of the fuel, rather than being based on the weight or volume of fuel derived from assumed values of fuel heat content.

It is a further object of the invention to provide a precise accounting of actual heat content of fuel loaded on an aircraft thereby resulting in increased efficiencies of airline flight plans.

It is yet a further object of the invention to more precisely determine the fuel requirements for each selected flight based on actual fuel energy content.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, there is provided a method for loading an aircraft fuel tank with a measured quantity of fuel having sufficient energy content for a selected flight, comprising the steps of calculating the total required energy content of fuel sufficient for a selected flight, determining at discrete intervals the total energy content of fuel in the fuel tank during fuel loading, comparing the calculated total energy sufficient for the selected flight with the determined total content of fuel in the tank to obtain the difference therebetween, and terminating fuel loading in accordance with the obtained difference.

In accordance with the present invention there is further provided a system for loading an aircraft fuel tank with a measured quantity of fuel having a total energy content sufficient for a selected flight comprising means for measuring the quantity of fuel loaded in the aircraft fuel tank at discrete intervals during fuel loading, means for determining the total energy content of the fuel in the fuel tank at discrete intervals during fuel loading, means for comparing the total energy content sufficient for the selected flight with the total energy content of fuel in the tank during fuel loading to obtain the difference therebetween, and means for terminating fuel loading in accordance with the difference.

BRIEF DESCRIPTION OF THE DRAWINGS

The accompanying drawings, which are incorporated in and constitute a part of this specification, illustrate preferred embodiments of the invention and, together with the general description given above and the detailed description of the preferred embodiments given below, serve to explain the principles of the invention.

DESCRIPTION OF THE PREFERRED EMBODIMENT

Reference will now be made in detail to the present preferred embodiments of the invention as illustrated in the accompanying drawings.

Figure 1:
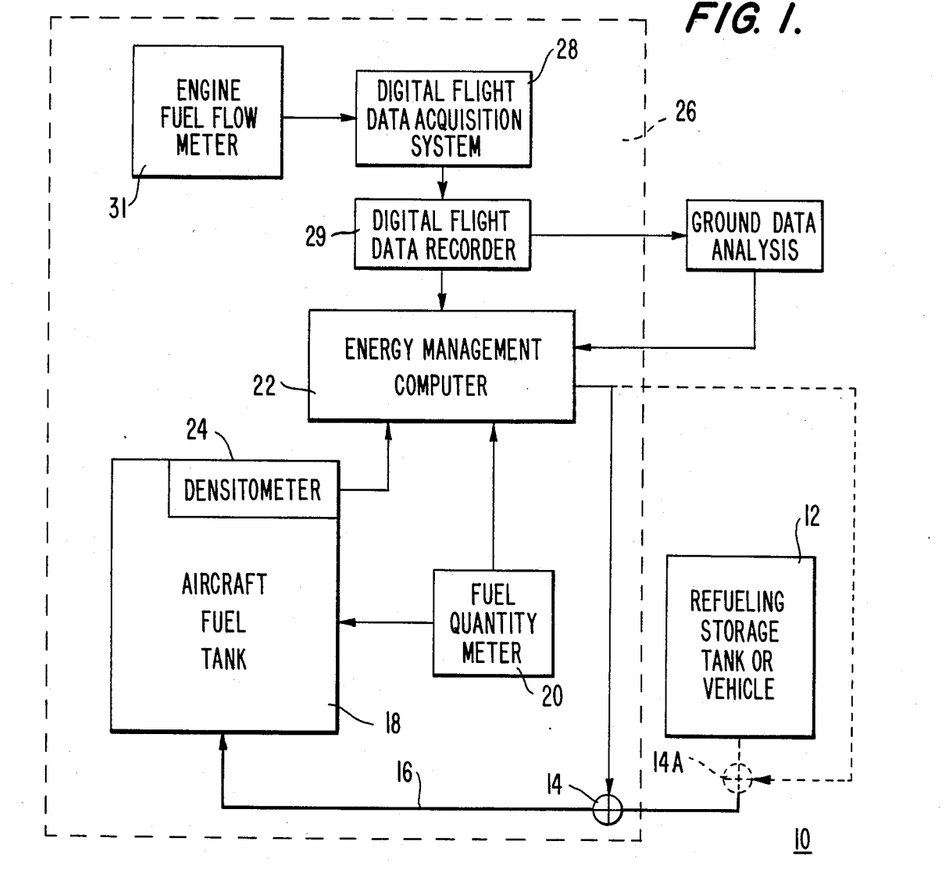
FIG. 1 is a schematic block diagram of a system for loading an aircraft with fuel in accordance with a first preferred embodiment of the present invention.

In accordance with a preferred embodiment of the present invention and as shown in FIG. 1 there is provided a system 10 for loading a fuel tank 18 of an aircraft 26 with a measured quantity of fuel having sufficient energy content for a selected flight. System 10 includes a refueling storage tank 12 detachably connected to a refueling line 16 through a means for terminating refueling in response to a control signal. Tank 12 may be fixed in position or may be mounted on a vehicle. The invention includes means for terminating refueling in response to a control signal. As embodied herein, the means for terminating refueling is a refueling control device 14 operable to initiate and terminate refueling. Device 14 may include a valve or valves to selectively supply or cut off the flow of fuel from tank 12 to line 16 in response to a control signal, and may be located on board aircraft 26, or alternatively as shown at 14 in FIG. 1, may be located offboard aircraft 26. If located offboard, device 14 may include a pump, a valve, or both. Refueling line 16 is detachably connected to an aircraft fuel tank 18 which is configured to receive fuel from line 16.

As schematically illustrated in FIG. 1, there is provided a means for measuring the density of the fuel in tank 18. As embodied herein, the means for measuring the density of the fuel is a densitometer 24 located in the fuel tank. There is further provided a means for measuring the quantity of fuel loaded in tank 18 during refueling. As embodied herein and as illustrated in FIG. 1, the means for measuring the quantity of fuel is a fuel quantity meter 20 located on the aircraft to sense the change in volume of fuel in tank 18. In accordance with the invention there is further provided a means for calculating the total energy content of fuel in tank 18 at discrete intervals during refueling. Preferably, the means for calculating the total energy content of the fuel is an energy management computer 22 which receives data on fuel quantity and density at discrete intervals from densitometer 24 and fuel quantity meter 20 and converts this data into a value for energy content of the fuel in tank 18 in accordance with an energy density relationship. Energy content, or heat content, of aircraft fuel is an empirically derived linear function of fuel density. That is, $$E = xD + y$$

where E = energy content per unit quantity
D = measured density and
x and y are derived constants.

Figure 2:
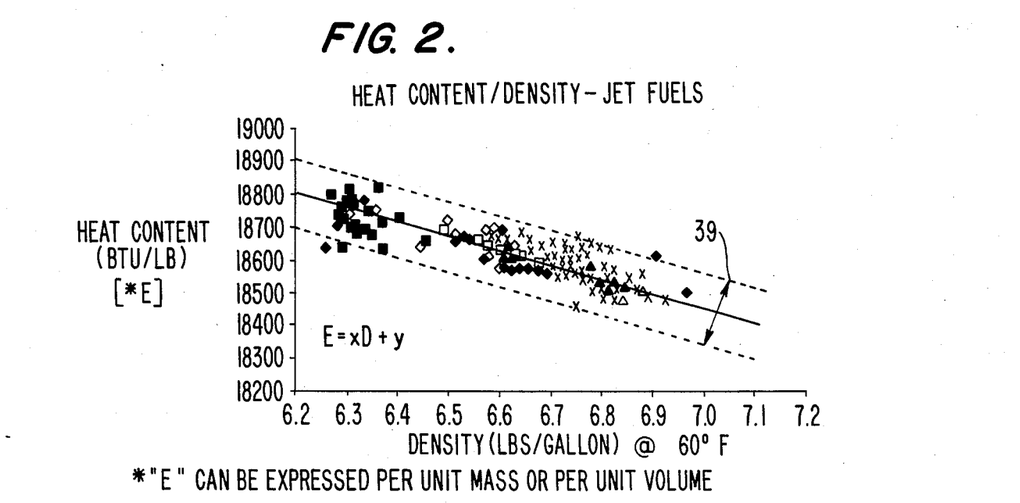
FIG. 2 is a graph showing the relationship between fuel density and energy content, from which is derived an energy content density equation.

Such a relationship is graphically depicted in FIG. 2. Since the energy density relationship is an empirically defined function, there is an error band associated with the function as indicated at 39 in FIG. 2.

As schematically shown in FIG. 1, the energy management computer 22, fuel quantity meter 20 and densitometer 18 are all located onboard an aircraft 26. Also shown in FIG. 1 is a fuel flow rate meter 31 that provides fuel flow rate data to a digital flight data acquisition system 28 and associated digital flight data recorder 29 of aircraft 26.

Computer 22 may be a Fuel Quantity Indicating System microprocessor, such as the Honeywell Part #HG 1057 processor currently used on commercial airlines such as the Boeing 767s. The logic board in the processor is programmed to solve the linear function of FIG. 2 to obtain energy content from fuel density. Fuel quantity meter 20 may be standard unit currently used on commercial aircraft, such as the Smith Industries #20-212-07 with Honeywell FG 1007 compensator and Honeywell FG 1006 type probes. Densitometer 24 may be a standard tank mounted unit, such as Solartron Transducer series 7824 with temperature compensation. The fuel flow rate meter 31 may be a GE type 8TJ124GGN1 flow meter. Signals from fuel flow rate meter 31 and fuel quantity meter 20 are processed by the digital flight data acquisition system 28 which may be a Hamilton Standard 775 110-16-001, and recorded by digital flight data recorder 29 which may be a Sundstrand 980-4100-BXUS.

Prior to the flight, the total energy content required for the selected flight is entered into computer 22. Energy management computer 22 repeatedly integrates the calculated average energy content (BTU per unit weight or BUT per unit volume) of the fuel in the aircraft fuel tank 18 with the measured quantity of fuel sensed by meter 20 in aircraft fuel tank 18 to calculate the total energy content of fuel in the aircraft fuel tank at discrete intervals of, for example, 30 seconds, and compares the required energy content for a selected flight with the calculated total energy content of the fuel in the aircraft fuel tank to obtain the difference therebetween. When energy management computer 22 determines that the difference between the required energy content of fuel for the selected flight and the calculated total energy content of fuel loaded on the aircraft is zero, energy management computer 22 generates a control signal to refueling station 14 to terminate refueling.

Figure 3:
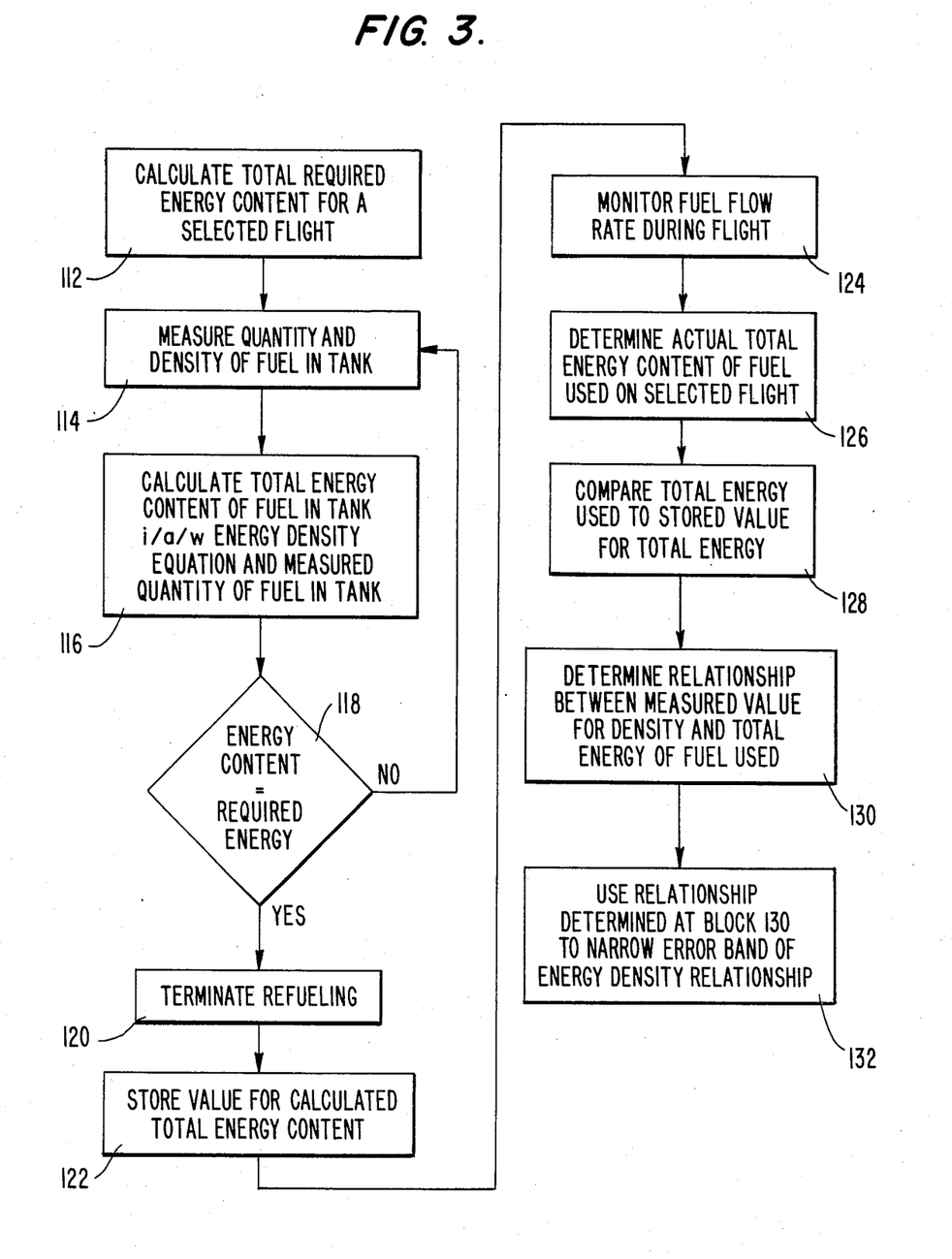
FIG. 3 is a chart illustrating a sequence of steps of the method of the first embodiment of the present invention shown in FIG. 1 utilizing a densitometer to determine the energy content in accordance with the equation of FIG. 2.

The method of the first embodiment of the present invention will be described in greater detail with regard to FIG. 3 and with continued reference to FIG. 1. As shown in FIG. 3 the required energy content of fuel for the selected flight is determined at block 112, including safety margins. Methods for calculating such total energy content are well known, and include the solution of an equation based on parameters such as aircraft and engine performance characteristics, predicted environmental conditions, predicted flight profile parameters (distance, speed, altitude, etc.), assumed fuel heat content, and payload. Such parameters are related by a fuel consumption function which is specific to each aircraft and engine combination.

At block 114 the quantity and density of fuel in tank 18 is measured using fuel quantity meter 20 and densitometer 24. At block 116 the total energy content of the fuel on-board the aircraft is determined by energy management computer 22, by solving the energy content density equation graphically depicted in FIG. 2 for energy content per unit and multiplying by the measured quantity of fuel in the tank. At block 118 energy management computer 22 compares the total energy content of the fuel on-board the aircraft to the predetermined required total energy content for the selected flight determined at block 112. If the energy content of the fuel does not meet the required energy content for the selected flight additional measurements of the density and quantity of fuel on-board the aircraft are taken and the steps described in blocks 114, 116, and 118 are repeated.

With continued reference to FIG. 3, when the energy content for the fuel loaded on the aircraft equals the required energy content of fuel for the selected flight at block 118, energy management computer 22 generates a control signal at block 120 which is transmitted to station 14 to terminate refueling. At block 122 energy management computer 22 sends the last measured value for density of the fuel in tank 18 to digital flight data acquisition system 28 for storage on digital flight data recorder 29.

At block 124 the flow rate of fuel to the engines is measured during the flight using flow rate meter 31, and the data therefrom is sent to digital flight data acquisition system 28 for storage on digital flight data recorder 29. At block 126, the total energy content of the fuel actually used on the selected flight is determined at the end of the flight. At block 128 energy management computer 22 compares the total energy content of the fuel actually used on the selected flight to the total energy content of the fuel calculated at block 116, and subtracts reserve fuel requirements. At block 130 energy magagement computer 22 utilizes the difference between the total energy content of the fuel actually used, the energy content of the fuel calculated at block 116, and stored data from block 124 relating to fuel flow, during flight to determine the relationship between the measured value for density and the energy content for fuel actually used during the selected flight. Specifically, this relationship is determined in the following manner. The fuel usage predicted for the selected flight at block 112 using an assumed heat content and flight profile data is corrected for the selected flight by recalculating the predicted fuel usage by solving the same well-known fuel consumption function using the actual on board fuel energy content, as derived from the empirical energy content/density relation of FIG. 2, and using the actual stored flight profile data. The actual fuel usage and the corrected predicted fuel usage are used to obtain a corrected heat content for the loaded fuel using the following comparative relation derived from the standard endurance equation:

$$\Delta H_{(2)} = \Delta H_{(1)} \times \frac{Ln\left(\frac{W_{B(1)}}{W_{F(1)}}\right)}{Ln\left(\frac{W_{B(2)}}{W_{F(2)}}\right)}$$

Where:
H = Heat Content
W = Aircraft Weight
B refers to beginning of flight period
F refers to end of flight period
1 refers to corrected plan
2 refers to actual flight and:
$W_F = W_B -$ Fuel Used At block 132 the derived corrected actual heat content from block 130 for several flights is stored in digital flight data recorder 29 with the actual fuel densities until sufficient energy content/density data are obtained to refine the relationship by well-known linear regression techniques and establish new deviation limits associated with the heat content/density relationship of FIG. 2. The aircraft thus acts as a calorimeter to improve the accuracy of data used to establish the deviation of the relationship of FIG. 2 and to account for errors in specific aircraft fuel loading and measuring systems. The analysis of steps 130 and 132 could also be conducted by reading data from digital flight data recorder 29 and calculating a revised heat content/density relationship using a computer off board aircraft 26.

Figure 4:
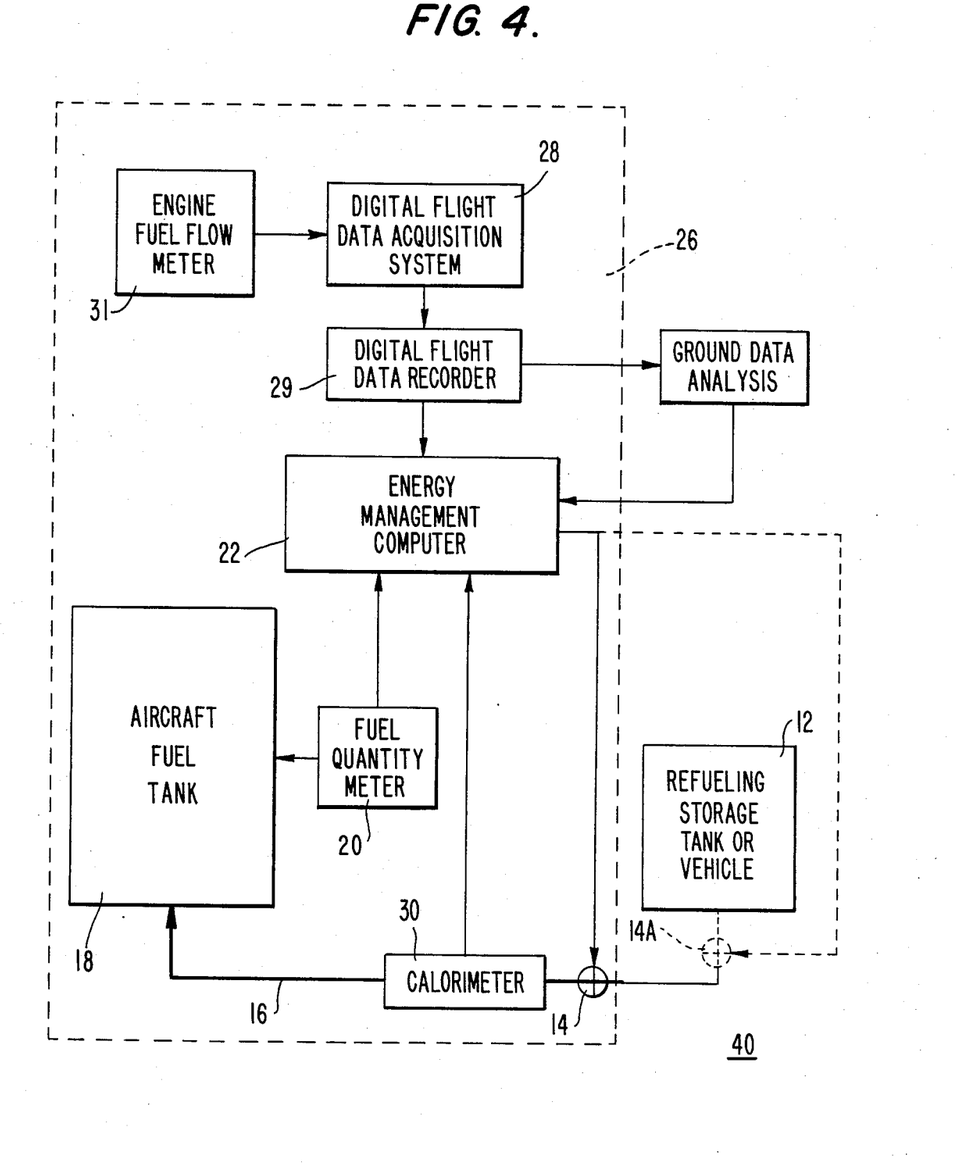
FIG. 4 is a schematic block diagram of a system for loading an aircraft with fuel in accordance with a second preferred embodiment of the present invention.

FIG. 4 illustrates a system 40 in accordance with a second embodiment of the present invention. Components of system 40 which function in an identical manner to the same components in system 10 are identified with the same reference characters and will not be described in detail.

System 40 loads aircraft fuel tank 18 with a measured quantity of fuel having sufficient total energy content for a selected flight as measured by a calorimeter 30. With reference to FIG. 4, calorimeter 30 measures the energy content of fuel loaded in aircraft fuel tank 18 and transmits at discrete intervals the energy content values to energy management computer 22. Calorimeter 30 may measure heat content by direct oxidation of the fuel or indirectly through the measurement of a property or properties that are directly related to heat content. Since hydrogen content of a fuel can be closely correlated with fuel energy content, an Oxford Analytical Newport 4000 in-line hydrogen analyzer may be used as calorimeter 30.

Fuel quantity meter 20 measures the volume of fuel loaded in the aircraft fuel tank and transmits a value for the quantity of fuel to the energy management computer 22. Energy management computer 22 integrates the value for the energy content of the loaded fuel and the quantity of fuel loaded in aircraft fuel tank 18 to determine the total energy content of fuel loaded in the tank. A value for the required total energy content of fuel for a selected flight previously entered into energy management computer 22 is compared by computer 22 to the calculated total energy value of fuel loaded on the aircraft fuel tank 18. When the total energy content of fuel loaded on aircraft fuel tank 18 meets the calculated required total energy content of fuel for the selected flight, energy management computer 22 generates a control signal which is transmitted to refueling station 14 to terminate refueling in the same manner as described in the first preferred embodiment of the invention.

Figure 5:
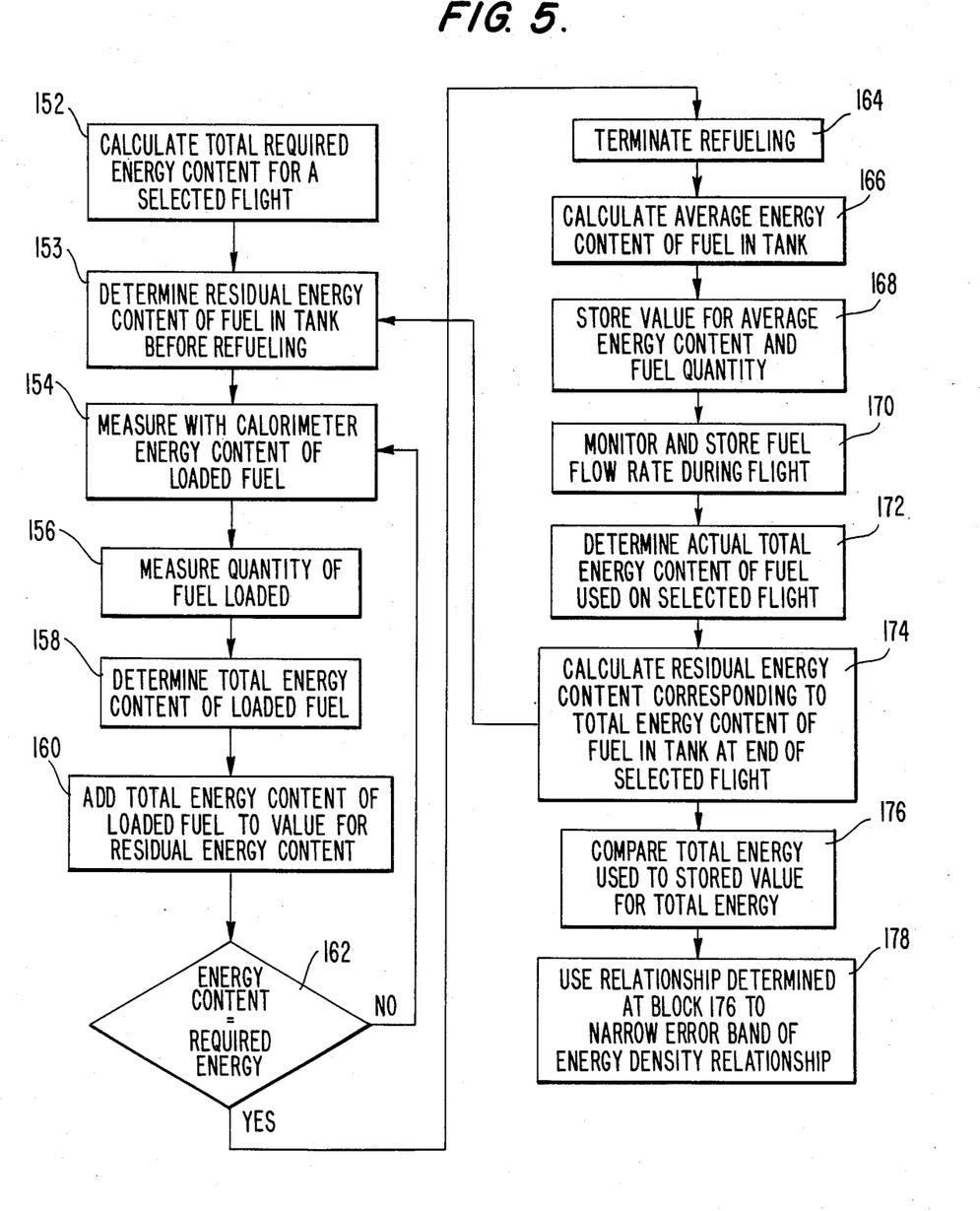
FIG. 5 is a chart illustrating a sequence of steps of the method in accordance with the second embodiment of the invention utilizing a calorimeter to measure the energy content of the fuel.

The method of the second embodiment of the invention will be described in greater detail with regards to FIG. 5 and with continued reference to FIG. 4. At block 152 the total required energy content of fuel for a selected flight is entered into energy management computer 22 as determined by a well-known off board fuel consumption function using an assumed fuel heat content value and the planned profile for the selected flight; that is, the distance, airspeed, altitude, and winds. Next, at block 153, the residual energy content of fuel in tank 18 prior to refueling is recalled from memory in computer 22. At block 154 the energy content of the fuel being loaded into tank 18 is measured with calorimeter 30. At block 156 the quantity of fuel loaded on the aircraft fuel tank is measured by meter 20. At block 158 the total energy content of fuel on board the aircraft is calculated in accordance with the measured quantity of fuel from block 156 and the measured energy content of the fuel from block 154. At block 160 the calculated total energy content of loaded fuel is added to the stored value for residual total energy content of fuel remaining in the tanks from the last prior refueling. At block 162 energy management computer 22 determines whether the total energy of the fuel in tank 18 meets the required energy for the selected flight. If at block 162 energy management computer 22 determines that the total energy of the fuel in tank 18 does not meet the required energy content of fuel for the selected flight, the steps of blocks 154, 156, 158, and 160 are repeated until the total energy content of the fuel in tank 18 meets the required energy content of fuel for a selected flight.

When the total energy content of the fuel in tank 18 meets the required energy content of fuel for the selected flight, energy management computer 22 generates a control signal at block 164 which is transmitted to refueling station 14 to terminate refueling. At block 166 energy management computer 22 calculates an average energy content of fuel in tank 18 based on the energy content of the loaded fuel measured with calorimeter 30 and the quantity of fuel loaded on the aircraft measured by meter 20. At block 168 the average energy content of the fuel and quantity of fuel in tank 18 is sent to the digital flight data acquisition system 28 for storage on the digital flight data recorder 29.

At block 170, fuel flow rates are sent to the digital flight data acquisition system 28 during the selected flight for storage on the digital flight data recorder 29. Flight profile data for the selected flight is also stored concurrently with fuel flow data.

At block 172 the actual quantity of fuel used on the selected flight is determined based on the quantity of fuel remaining in tank 18 at the end of the selected flight; and the actual energy content of the fuel used on the flight is calculated by the energy management computer based on the value stored at block 168 for the average energy content of the fuel loaded in tank 18. Alternatively, the integrated values of fuel flow rate and quantity of fuel on board prior to flight may be used to determine fuel remaining after the flight. At block 174 the residual energy content of fuel remaining on the aircraft at the end of the selected flight is calculated using the average energy content of block 168 and quantity of fuel remaining (block 172) and stored for use on the next flight by energy management computer 22 at block 153. At block 176 energy management computer 22 compares the actual total energy content of the fuel used on the selected flight to the total energy content of the fuel loaded in tank 18 at the last refueling. At block 178 the difference between the energy content of the fuel used on the selected flight and the total energy content of the fuel loaded in tank 18, corrected for fuel added as a safety reserve, is sent to the digital flight data acquisition system 28 during the selected flight for storage on the digital flight data recorder 29. This stored value for the difference therebetween is later used with the stored data relating to fuel flow rate and flight profile data to calibrate calorimeter 30 in the following manner.

The fuel usage predicted for the selected flight using an assumed energy content is corrected using the actual average energy content and quantity of the fuel on board, as stored at block 168, and the stored flight profile data for the selected flight. The actual fuel usage and the corrected predicted fuel usage are used to obtain a corrected heat content for the loaded fuel using the following comparative relation derived from the standard endurance equation:

$$\Delta H_{(2)} = \Delta H_{(1)} \times \frac{Ln\left(\frac{W_{B(1)}}{W_{F(1)}}\right)}{Ln\left(\frac{W_{B(2)}}{W_{F(2)}}\right)}$$

Where:
H = Heat Content
W = Aircraft Weight
B refers to beginning of flight period
F refers to end of flight period
1 refers to corrected plan
2 refers to actual flight and:
$W_F = W_B -$ Fuel Used At block 178 the derived corrected actual heat content from block 176 for several flights is stored in digital flight data recorder 29 with the heat content measured using calorimeter 30 until sufficient heat content data are collected to established a measurement deviation limit. The aircraft thus acts as its own calorimeter to improve the accuracy of data used to account for errors in specific aircraft fuel loading and measuring systems.

The analysis of step 178 could also be conducted as a ground operation rather than being performed by energy management computer 20.

Additional advantages and modifications will readily occur to those skilled in the art. The invention in its broader aspects is therefore, not limited to the specific details, representative apparatus and illustrated examples shown and described. Accordingly, departures may be made from such details without departing from the spirit or scope of applicants general inventive concept.

What is claimed is:

1. A method for loading an aircraft fuel tank with a measured quantity of fuel having sufficient energy content for a selected flight, comprising the steps of:

calculating the total required energy content of fuel sufficient for said selected flight based on aircraft operational characteristics and flight parameters;

determining at discrete intervals the total energy content of fuel in said fuel tank during fuel loading;

comparing said calculated total energy sufficient for said selected flight with said determined total energy content of fuel in said tank during fuel loading to obtain the difference therebetween; and terminating fuel loading in accordance with said difference.

2. The method as claimed in claim 1, wherein the step of determining the energy content of said fuel in said fuel tank during fuel loading includes the substeps of measuring the quantity and density of said fuel in said fuel tank during fuel loading, and calculating the total energy content of said fuel in accordance with said measured quantity and the following energy content-/density equation:

$$E = xD + y$$

where E = energy content per unit quantity
D = measured density and
x and y are derived constants.

3. The method as in claim 2 wherein said energy content/density equation has an error band associated therewith, and further including the steps of:

storing a value of said determined total energy content of fuel in said tank at termination of fuel loading;

storing quantity and average energy content of fuel on board prior to said selected flight and engine fuel flow rate, nd flight profile data during said selected flight;

determining the actual energy content of fuel used on said selected flight; and narrowing the error band of said energy content/density equation in accordance with said stored value for total energy content of fuel, said actual energy content of fuel used on said selected flight, and said stored engine fuel flow rate, fuel quantity, average energy content, and flight profile data.

4. A method for loading an aircraft fuel tank with a measured quantity of fuel having sufficient energy content for a selected flight, comprising the steps of:

calculating the total required energy content of fuel for said selected flight based on aircraft operational characteristics and flight parameters;

determining the total energy content of fuel in said fuel tank prior to commencing fuel loading;

determining the total energy content of said fuel loaded in said fuel tank during fuel loading;

calculating the total energy content of fuel in said fuel tank at discrete intervals during fuel loading in accordance with said determined total energy content of fuel in said fuel tank prior to fuel loading and said determined total energy content of fuel loaded during fuel loading;

comparing said calculated total energy required for said selected flight with said calculated total energy content of fuel in said fuel tank to obtain the difference therebetween; and terminating fuel loading in accordance with said difference.

5. The method as in claim 4, wherein the step of determining the total energy content of said fuel loaded in said fuel tank during fuel loading includes the substeps of sensing, with a calorimeter, a calorimetric value of the average energy content of said fuel loaded in said tank during fuel loading, measuring the quantity of fuel loaded in said aircraft fuel tank during fuel loading, and integrating with said measured quantity of fuel loaded during fuel loading to obtain a value for total energy content of fuel in said tank.

6. The method as in claim 4, further including the steps of:

values for storing quantity and average energy content of fuel on board prior to said selected flight, and flight profile data and engine fuel flow rate during said selected flight;

calculating a value for actual energy used on said selected flight in accordance with said stored value for average energy content of fuel in said tank prior to said selected flight and the quantity of fuel remaining after said selected flight;

comparing said value for actual energy used to said total energy content of fuel loaded to obtain and store a value for the difference therebetween; and recalibrating said calorimeter in accordance with stored value difference and said stored engine fuel flow rate fuel quantity, energy content, and flight profile data.

7. The method as in claim 4, wherein the step of determining the total energy content of said fuel in said fuel tank prior to fuel loading includes the substeps of:

calculating and storing a value for average energy content of said fuel in said tank at termination of an immediately preceding fuel loading operation;

measuring the quantity of fuel remaining in said fuel tank prior to current fuel loading for said selected flight; and calculating a residual energy content of fuel in said tank in accordance with said stored value for average energy content and sid measured quantity of fuel remaining in said tank prior to commencing current fuel loading, said residual energy content corresponding to said total energy content of fuel in said tank prior to current fuel loading.

8. A system for loading an aircraft fuel tank with a measured quantity of fuel having a total energy content sufficient for a selected flight, comprising:

means for measuring the quantity of fuel loaded in said aircraft fuel tank at discrete intervals during fuel loading;

means for determining the total energy content of said fuel in said fuel tank at discrete intervals during fuel loading;

means for comparing said total energy content sufficient for said selected flight with said total energy content of fuel in said tank during fuel loading to obtain the difference therebetween; and means for terminating fuel loading in accordance with said difference.

9. A system as in claim 8, wherein the means for determining the energy content of said fuel loaded in said fuel tank during fuel loading includes means for measuring the density of said fuel in said fuel tank during fuel loading, and means for calculating the energy content of said fuel in accordance with the following energy content/density relationship and said measured quantity of fuel in said tank:

$$E = xD + y$$

where E = energy content per unit quantity
D = measured density and
x and y are empirically derived constants.

10. The system as in claim 8, wherein said means for determining said total energy content of said fuel in said fuel tank during fuel loading includes a calorimeter for sensing a value for the energy content of said fuel loaded in said tank during fuel loading.

11. A system for loading an aircraft fuel tank with a measured quantity of fuel having sufficient energy content for a selected flight, comprising:

means for measuring at discrete intervals the quantity of fuel loaded in said fuel tank during fuel loading;

means for calculating at discrete intervals the total energy content of said fuel loaded in said fuel tank during fuel loading;

means for determining the total energy content of fuel in said tank prior to fuel loading;

means for calculating the total energy content of fuel in said fuel tank in accordance with said total energy content of fuel loaded in said tank during fuel loading and said total energy content of fuel in said tank prior to refueling;

means for comparing at discrete intervals said energy content sufficient for said selected flight and said calculated total energy content of said fuel in said tank to obtain the difference therebetween; and means for terminating fuel loading in accordance with said difference.

12. The system as in claim 11, wherein the means for determining the total energy content of said fuel in said fuel tank prior to refueling comprises:

means for calculating and storing an average energy content of said fuel in said tank at termination of an immediately preceding fuel loading operation;

means for measuring the quantity of fuel remaining in said fuel tank prior to fuel loading; and means for calculating a residual energy content of fuel in said tank in accordance with said calculated average energy content of fuel in said tank and said measured quantity of fuel remaining in said tank;

said residual energy content corresponding to said total energy content of fuel in said tank prior to fuel loading.

* * * * *

UNITED STATES PATENT AND TRADEMARK OFFICE
CERTIFICATE OF CORRECTION

PATENT NO. : 4,809,174

DATED : February 28, 1989

INVENTOR(S) : Albert M. Momenthy

It is certified that error appears in the above-identified patent and that said Letters Patent is hereby corrected as shown below:

Claim 6, col. 9, line 27: "values for storing" should be --storing values for--.

Claim 7, col. 9, line 55: "sid" should be --said--.

Signed and Sealed this

Nineteenth Day of June, 1990

Attest:

HARRY F. MANBECK, JR.

*Attesting Officer*

*Commissioner of Patents and Trademarks*